(12) United States Patent
Pugh et al.

(10) Patent No.: US 8,975,121 B2
(45) Date of Patent: Mar. 10, 2015

(54) METHODS AND APPARATUS TO FORM THIN FILM NANOCRYSTAL INTEGRATED CIRCUITS ON OPHTHALMIC DEVICES

(71) Applicant: Johnson & Johnson Vision Care, Inc., Jacksonville, FL (US)

(72) Inventors: Randall B. Pugh, Jacksonville, FL (US); Frederick A. Flitsch, New Windsor, NY (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 13/891,170

(22) Filed: May 9, 2013

(65) Prior Publication Data

US 2014/0335661 A1  Nov. 13, 2014

(51) Int. Cl.
*H01L 21/44* (2006.01)
*G02C 11/00* (2006.01)
*B29D 11/00* (2006.01)

(52) U.S. Cl.
CPC .......... *G02C 11/10* (2013.01); *B29D 11/00807* (2013.01)
USPC . 438/126; 351/158; 351/159.03; 351/159.04; 351/159.24; 351/159.73

(58) Field of Classification Search
None
See application file for complete search history.

(56) References Cited

U.S. PATENT DOCUMENTS

| | | |
|---|---|---|
| 2007/0159562 A1 | 7/2007 | Haddock et al. |
| 2010/0078838 A1 | 4/2010 | Pugh et al. |
| 2010/0081772 A1* | 4/2010 | Zanini et al. ................. 525/450 |
| 2010/0102313 A1 | 4/2010 | Miyairi et al. |
| 2010/0202090 A1 | 8/2010 | Shishido et al. |
| 2012/0234453 A1 | 9/2012 | Pugh et al. |

FOREIGN PATENT DOCUMENTS

WO        02057836 A1      7/2002

OTHER PUBLICATIONS

PCT International Search Report for PCT/US2814/837337 Date of Mailing Sep. 26, 2014.

* cited by examiner

*Primary Examiner* — Kyoung Lee (57) ABSTRACT

This invention discloses methods and apparatus to form thin film nanocrystal integrated circuit transistors upon three dimensionally formed insert devices. In some embodiments, the present invention includes incorporating the three dimensional surfaces with thin film nanocrystal integrated circuit based thin film transistors, electrical interconnects and energization elements into an insert for incorporation into ophthalmic lenses. In some embodiments the formed insert may be directly used as an ophthalmic device or incorporated into an ophthalmic device.

20 Claims, 8 Drawing Sheets

| 601 | FORM A THIN FILM NANOCRYSTAL INTEGRATED CIRCUIT DEVICE AND INCLUDE ON A STACKED LAYER, WHEREIN THE STACKED LAYER MAY BE PROCESSED INTO AN INSERT PIECE |
|---|---|
| 602 | OPTIONALLY DEFORM STACKED LAYER COMPRISING AT LEAST A SUBSTRATE AND THERMOFORM INTO A THREE-DIMENSIONALLY SHAPED INSERT PIECE |
| 603 | APPLY METAL TRACE AND INTERCONNECT FEATURES |
| 604 | APPLY ENERGIZATION ELEMENT COMPONENTS UPON SELECT METAL TRACE REGIONS |
| 605 | ELECTRICALLY CONNECT THE THIN FILM NANOCRYSTAL INTEGRATED CIRCUIT DEVICE TO THE CIRCUIT COMPONENTS |
| 606 | ENCAPSULATE AND SEAL INTERCONNECT AND TRACE REGIONS TO COMPLETE STACKED LAYER |
| 607 | CUT OUT AN INSERT PIECE FROM STACKED LAYER, OPTIONALLY REMOVING OPTIC ZONE REGION |
| 608 | COMPLETE ASSEMBLY OF INSERT PIECE INTO A MEDIA INSERT |
| 609 | ENCAPSULATE MEDIA INSERT TO FORM AN OPHTHALMIC DEVICE |

METHODS AND APPARATUS TO FORM THIN FILM NANOCRYSTAL INTEGRATED CIRCUITS ON OPHTHALMIC DEVICES

FIELD OF USE

This invention describes methods and apparatus operant to form a device wherein thin film nanocrystal transistors and integrated circuit devices are defined upon Ophthalmic Device insert components. In some embodiments, the methods and apparatus to form Thin Film Nanocrystal Integrated Circuit devices within Ophthalmic Devices relate to said formation upon surfaces that occur on substrates that have three-dimensional shapes. In some embodiments, a field of use for the methods and apparatus may include Ophthalmic Devices, which incorporate energization elements, inserts and Thin Film Nanocrystal Integrated Circuit devices.

BACKGROUND

Traditionally, an Ophthalmic Device, such as a contact lens, an intraocular lens, or a punctal plug included a biocompatible device with a corrective, cosmetic, or therapeutic quality. A contact lens, for example, may provide one or more of vision correcting functionality, cosmetic enhancement, and therapeutic effects. Each function is provided by a physical characteristic of the lens. A design incorporating a refractive quality into a lens may provide a vision corrective function. A pigment incorporated into the lens may provide a cosmetic enhancement. An active agent incorporated into a lens may provide a therapeutic functionality. Such physical characteristics are accomplished without the lens entering into an energized state. A punctal plug has traditionally been a passive device.

More recently, active components have been incorporated into a contact lens. Some components may include semiconductor devices. Some examples have shown semiconductor devices embedded in a contact lens placed upon animal eyes. It has also been described how the active components may be energized and activated in numerous manners within the lens structure itself. The topology and size of the space defined by the lens structure creates a novel and challenging environment for the definition of various functionalities. In many embodiments, it is important to provide reliable, compact and cost effective means to energize components within an Ophthalmic Device. In some embodiments, these energization elements may include batteries, which may also be formed from "alkaline" cell based chemistry. Connected to these energization elements may be other components that utilize their electrical energy. In some embodiments, these other components may include transistors to perform circuit functions. It may be useful and enabling to include in such devices Thin Film Nanocrystal Integrated Circuit devices.

SUMMARY

Accordingly, the present invention includes a method of forming an Ophthalmic Device with a Media Insert, which may comprise depositing a first Thin Film Nanocrystal Integrated Circuit layer on a first substrate. An Insert Piece may be cut from the substrate and assembled into a first Media Insert. The Media Insert may be encapsulated in an Ophthalmic Device, for example, through an injection-molding process.

A portion of the substrate may be formed into a Three-dimensional Shape, for example, through a thermoforming process or a folding process. The forming may occur after the depositing of the Thin Film Nanocrystal Integrated Circuit layer on the first substrate. In some embodiments, the first Thin Film Nanocrystal Integrated Circuit layer may be deposited on the substrate before the Insert Piece is cut from the first substrate or before the substrate is formed into the Three-dimensional Shape.

In some embodiments, a first gate conductor may be formed on the substrate proximate to the Thin Film Nanocrystal Integrated Circuit layer. The forming of the gate conductor may occur before the deposition of the Thin Film Nanocrystal Integrated Circuit layer on the substrate. The forming of the first source/drain conductor on the Thin Film Nanocrystal Integrated Circuit layer may be performed in the same processing as the forming of the electrical interconnect traces upon the first substrate.

Some embodiments may include a second Thin Film Nanocrystal integrated circuit layer deposited on a second substrate. A second Insert Piece may be cut from the second substrate and assembled into the Media Insert. In some such embodiments, the second Thin Film Nanocrystal Integrated Circuit layer may comprise a first n-type Thin Film Nanocrystal Integrated Circuit layer, and the first Thin Film Nanocrystal Integrated Circuit layer may comprise a first p-type Thin Film Nanocrystal Integrated Circuit layer.

An energization element, such as, for example, an electrochemical cell, may be deposited upon a region of the substrate, wherein the energization element may be in electrical communication with the Thin Film Nanocrystal Integrated Circuit layer. The energization element may be sealed to the substrate in some embodiments. The electrical interconnect traces may be capable of placing the energization element in electrical communication with the gate conductor.

In some embodiments, a source/drain conductor may be formed on the Thin Film Nanocrystal Integrated Circuit layer, and electrical interconnect traces may be formed upon the substrate, wherein the electrical interconnect traces are capable of placing the first source/drain conductor in electrical communication with the first energization element. In some embodiments, a second energization element may be deposited upon a third substrate. A third Insert Piece may be formed from the third substrate and may be assembled into Media Insert.

In alternate embodiments, the method for forming a Ophthalmic Device with a Media Insert may comprise depositing an n-type Thin Film Nanocrystal Integrated Circuit layer and a p-type Thin Film Nanocrystal Integrated Circuit on a substrate. A conductive layer may be deposited upon the substrate, wherein the conductive layer may comprise a plurality of isolated conductive traces, wherein the isolated conductive traces comprise source/drain conductive features in electrical communication with the n-type and p-type Thin Film Nanocrystal Integrated Circuit layers.

A region of the substrate may be thermoformed into a Three-dimensional Shape, wherein the region may include a portion of the n-type Thin Film Nanocrystal Integrated Circuit layer, a portion of the p-type Thin Film Nanocrystal Integrated Circuit layer, and a portion of the conductive layer. An energization element may be deposited upon a portion of the conductive layer, wherein the energization element may be in electrical communication with the conductive layer.

An Insert Piece may be cut from the substrate, and the Insert Piece may be assembled into a Media Insert. The Media Insert may be encapsulated in an Ophthalmic Device, such as, for example, through an injection-molding process. In some embodiments, the energization element may comprise a plurality of energization components, wherein the conductive layer may be capable of placing the energization components in electrical series with each other.

Some embodiments may further comprise depositing a second conductive layer upon a second substrate, wherein a portion of the second conductive layer may comprise a plurality of isolated electrically conductive features, wherein the isolated electrically conductive features are capable of forming membrane switches with a region of the first conductive layer.

DESCRIPTION OF THE DRAWINGS

FIG. 8 illustrates a representation of an Insert Piece comprising the circuit elements of

DETAILED DESCRIPTION OF THE INVENTION

Recently, it has been demonstrated that specific methods of creating thin film nanocrystal transistors and integrated circuits may be consistent with flexible substrates. A key aspect in cadmium selenide based demonstrations may be the use of short chain inorganic based ligands, as may be demonstrated by thiocyanate materials, to coordinate the nanocrystals into useable and conductive layers.

The present invention relates to methods and apparatus useful to the formation of Thin Film Nanocrystal Integrated Circuit devices for incorporation into an Ophthalmic Lens and in some embodiments mounted upon Media Inserts. In some embodiments, the insert structure may have surfaces that have three-dimensional topology. In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the presented invention, various terms may be used for which the following definitions will apply:

Anode: as used herein refers to an Electrode through which electric current flows into a polarized electrical device. The direction of electric current that is typically opposite to the direction of electron flow. In other words, the electrons flow from the Anode into, for example, an electrical circuit.

Cathode: as used herein refers to an Electrode through which electric current flows out of a polarized electrical device. The direction of electric current that is typically opposite to the direction of electron flow. Therefore, the electrons flow into the polarized electrical device and out of, for example, the connected electrical circuit.

Electrode: as used herein can refer to an active mass in the Energy Source. For example, it may include one or both of the Anode and Cathode.

Encapsulate: as used herein refers to creating a barrier to separate an entity, such as, for example, a Media Insert, from an environment adjacent to the entity.

Encapsulant: as used herein refers to a layer formed surrounding an entity, such as, for example, a Media Insert, that creates a barrier to separate the entity from an environment adjacent to the entity. For example, Encapsulants may be comprised of silicone hydrogels, such as Etafilcon, Galyfilcon, Narafilcon, and Senofilcon, or other hydrogel contact lens material. In some embodiments, an Encapsulant may be semipermeable to contain specified substances within the entity and preventing specified substances, such as, for example, water, from entering the entity.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device or layer which is capable of supplying Energy or placing a logical or electrical device in an Energized state.

Energy Harvesters: as used herein refers to device capable of extracting energy from the environment and convert it to electrical energy.

Functionalized: as used herein refers to making a layer or device able to perform a function including for example, energization, activation, or control.

Insert Piece: as used herein refers to a solid element of a multi-piece Rigid Insert or Media Insert that may be assembled into the Rigid Insert or Media Insert. In an Ophthalmic Device, an Insert Piece may contain and include a region in the center of an Ophthalmic Device through which light may proceed into the user's eye. This region may be called an Optic Zone. In other embodiments, the piece may take an annular shape where it does not contain or include some or all of the regions in an Optical Zone. In some embodiments, a Rigid Insert or Media Insert may comprise multiple Inserts Pieces, wherein some Insert Pieces may include the Optic Zone and other Insert Pieces may be annular or portions of an annulus.

Lens forming mixture or Reactive Mixture or Reactive Monomer Mixture (RMM): as used herein refers to a monomer or prepolymer material, which may be cured and crosslinked or crosslinked to form an Ophthalmic Lens. Various embodiments may include lens-forming mixtures with one or more additives such as: UV blockers, tints, photoinitiators or catalysts, and other additives one might desire in an Ophthalmic Lenses such as, contact or intraocular lenses.

Lens Forming Surface: refers to a surface that is used to mold a lens. In some embodiments, any such surface 103-104 can have an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface the desired optical characteristics, including without limitation, spherical, aspherical and cylinder power, wave front aberration correction, corneal topography correction and the like as well as any combinations thereof.

Lithium Ion Cell: refers to an electrochemical cell where Lithium ions move through the cell to generate electrical energy. This electrochemical cell, typically called a battery, may be reenergized or recharged in its typical forms.

Substrate insert: as used herein refers to a formable or rigid substrate capable of supporting an Energy Source within an Ophthalmic Lens. In some embodiments, the Substrate insert also supports one or more components.

Media Insert: as used herein refers to an encapsulated insert that will be included in an energized Ophthalmic Device. The energization elements and circuitry may be embedded in the Media Insert. The Media Insert defines the primary purpose of the energized Ophthalmic Device. For example, in embodiments where the energized Ophthalmic Device allows the user to adjust the optic power, the Media Insert may include energization elements that control a liquid meniscus portion in the Optical Zone. Alternatively, a Media Insert may be annular so that the Optical Zone is void of material. In such embodiments, the energized function of the Lens may not be optic quality but may be, for example, monitoring glucose or administering medicine.

Mold: refers to a rigid or semi-rigid object that may be used to form lenses from uncured formulations. Some preferred molds include two mold parts forming a front curve mold part and a back curve mold part.

NanoCrystal as used herein a nanocrystal is a crystalline particle with at least one dimension measuring less than 1000 nanometers (nm), where 1 nm is defined as 1 thousand-millionth of a meter ($10^{-9}$ m).

Ophthalmic Lens or Ophthalmic Device or Lens: as used herein refers to any device that resides in or on the eye. The device may provide optical correction, may be cosmetic, or provide some functionality unrelated to optic quality. For example, the term Lens may refer to a contact Lens, intraocular Lens, overlay Lens, ocular insert, optical insert, or other similar device through which vision is corrected or modified, or through which eye physiology is cosmetically enhanced (e.g. iris color) without impeding vision. Alternatively, Lens may refer to a device that may be placed on the eye with a function other than vision correction, such as, for example, monitoring of a constituent of tear fluid or means of administering an active agent. In some embodiments, the preferred Lenses of the invention may be soft contact Lenses that are made from silicone elastomers or hydrogels, which may include, for example, silicone hydrogels and fluorohydrogels.

Optic Zone: as used herein refers to an area of an Ophthalmic Lens through which a wearer of the Ophthalmic Lens sees.

Power: as used herein refers to work done or energy transferred per unit of time.

Precure: as used herein refers to a process that partially cures a mixture, such as a Reactive Monomer Mixture. In some embodiments, a precuring process may comprise a shortened period of the full curing process. Alternatively, the precuring process may comprise a unique process, for example, by exposing the mixture to different temperatures and wavelengths of light than may be used to fully cure the material.

Predose: as used herein refers to the initial deposition of material in a quantity that is less than the full amount that may be necessary for the completion of the process. For example, a predose may include a quarter of the necessary substance, such as, for example, a Reactive Monomer Mixture.

Postdose: as used herein refers to a deposition of material in the remaining quantity after the predose that may be necessary for the completion of the process. For example, where the predose includes a quarter of the necessary substance, a subsequent postdose may provide the remaining three quarters of the substance, such as, for example, a Reactive Monomer Mixture.

Rechargeable or Re-energizable: as used herein refers to a capability of being restored to a state with higher capacity to do work. Many uses within this invention may relate to the capability of being restored with the ability to flow electrical current at a certain rate for a specified, reestablished time period.

Reenergize or Recharge: To restore to a state with higher capacity to do work. Many uses within this invention may relate to restoring a device to the capability to flow electrical current at a certain rate for a specified, reestablished time period.

Released from a mold: means that a lens is either completely separated from the mold, or is only loosely attached so that it may be removed with mild agitation or pushed off with a swab.

Stacked: as used herein means to place at least two component layers in proximity to each other such that at least a portion of one surface of one of the layers contacts a first surface of a second layer. In some embodiments, a film, whether for adhesion or other functions may reside between the two layers that are in contact with each other through said film.

Stacked Integrated Component Devices or SIC Devices: as used herein refers to the product of packaging technologies that assemble thin layers of substrates, which may contain electrical and electromechanical devices, into operative integrated devices by means of stacking at least a portion of each layer upon each other. The layers may comprise component devices of various types, materials, shapes, and sizes. Furthermore, the layers may be made of various device production technologies to fit and assume various contours.

Thin Film Nanocrystal Integrated Circuit: as used herein refers to a semiconductor that is made from carbon-based materials and includes a Nanocrystal structure in electrical communication with an electrical current source.

Three-dimensional Surface or Three-dimensional Substrate or Three-dimensionally Formed: as used herein refers to any surface or substrate that has been Three-dimensionally Formed where the topography is designed for a specific purpose, in contrast to a planar surface.

Trace: as used herein refers to a battery component capable of electrically connecting the circuit components. For example, circuit Traces may include copper or gold when the substrate is a printed circuit board and may be copper, gold, or printed Deposit in a flex circuit. Traces may also be comprised of nonmetallic materials, chemicals, or mixtures thereof Three-Dimensionally Formed Media Inserts with Incorporated Energization Devices for Inclusion of Thin Film Nanocrystal Integrated Circuit Devices.

The methods and apparatus related to the inventive art herein relate to forming Thin Film Nanocrystal Integrated Circuit devices within or on Three-dimensionally Formed substrates where the substrates also include electrical interconnects upon its surfaces. Proceeding to FIG. 1, an exemplary Three-dimensional Substrate 100 with electrical traces 130-180 is illustrated. In some embodiments, a Three-dimensional Substrate 100 may comprise a portion of an Insert Piece for an Ophthalmic Device. Some embodiments may include an Ophthalmic Device that incorporates an active focusing element. Such an active focusing device may function while utilizing energy that may be stored in an energization element. The traces 130-180 upon the Three-dimensional Substrate 100 may provide a substrate foundation for formation of energization elements. Discrete Thin Film Nanocrystal Integrated Circuit devices or circuits formed from Thin Film Nanocrystal Integrated Circuit devices may be connected to said traces 130-180 through various processes.

Figure 1:
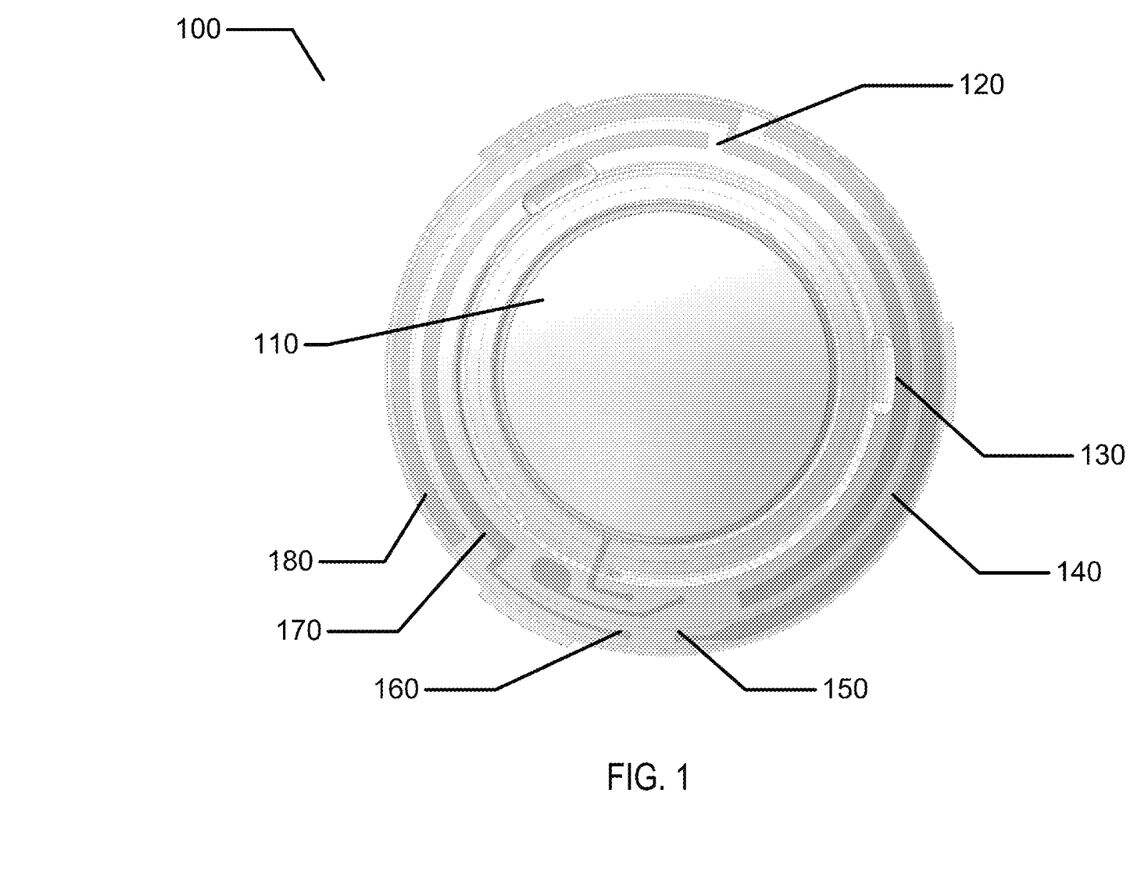
FIG. 1 illustrates an exemplary Insert Piece with Three-dimensional Surfaces upon which Thin Film Nanocrystal Integrated Circuit devices may be defined consistent with other related disclosures of the inventive entity.

In Ophthalmic Device embodiments, the Three-dimensional Substrate may include an optically active region 110. For example, where the device is a focusing element, the region 110 may represent a front surface of an Insert Piece that contains the focusing element through which light passes on its way into a user's eye. Outside of this region 110, there may be a peripheral region of the Insert Piece that is not in an optically relevant path. In some embodiments, components related to the active focusing function may be placed in such peripheral region. In some embodiments, especially those utilizing very thin films and transparent electrodes, the components may be placed in this optically active region. For example, transparent electrodes may comprise indium tin oxide (ITO). The various components may be electrically connected to each other by metal traces, and some of these components may contain or may be Thin Film Nanocrystal Integrated Circuit devices. These metal traces may also provide a support function to the incorporation of energizing elements into the Ophthalmic Device. In some embodiments, the energization element may be a battery. For example, the battery may be a solid-state battery or alternatively it may be a wet cell battery. In such embodiments, there may be a minimum of at least two traces that are electrically conductive to provide an electrical potential formed between the anode 150 of the battery and a cathode 160 of the battery to be provided to other active elements in the device for their energization. The anode 150 connection may represent the (−) potential connection of an energization element to incorporated devices. The cathode 160 connection may represent the (+) potential connection of an energization element to incorporated devices.

In some embodiments, Thin Film Nanocrystal Integrated Circuit elements may be connected through the anode 150 and cathode 160 connection points. In other embodiments, the Thin Film Nanocrystal Integrated Circuit devices may be formed directly upon the substrate 100 surface and may be connected with anode 150 and cathode 160 points or, alternatively, may be integrally connected by using the same metallurgy for interconnections within the circuit devices themselves.

The anode 150 and cathode 160 traces may be connected to isolated traces 140 and 170 respectively. These isolated traces 140 and 170 may lie close to neighboring traces 130 and 180. The neighboring traces 130 and 180 may represent the opposite battery chemistry or electrode type when battery elements are produced upon these traces 130 and 180. Thus, neighboring traces 130 and 180 may be connected to a chemical layer that may make it function as a cathode of a battery cell between traces 130 and 140.

The two neighboring traces 130 and 180 may connect to each other through a trace region 120. This region 120, in some embodiments, may not be covered by chemical layers, allowing the region to function as an electrical interconnection. In some exemplary embodiments, two pairs of electrical cells may be configured as batteries, and the nature of the layout and design may connect these two batteries in a series connection. The total electrical performance across connections 150 and 160 may be considered a combination of two battery cells. In embodiments that incorporate Thin Film Nanocrystal Integrated Circuit devices, the energization voltage requirements may be in the tens of volts. Accordingly, multiple regions 120 may be formed to allow the energization elements to define a higher total energization voltage.

Figure 2:
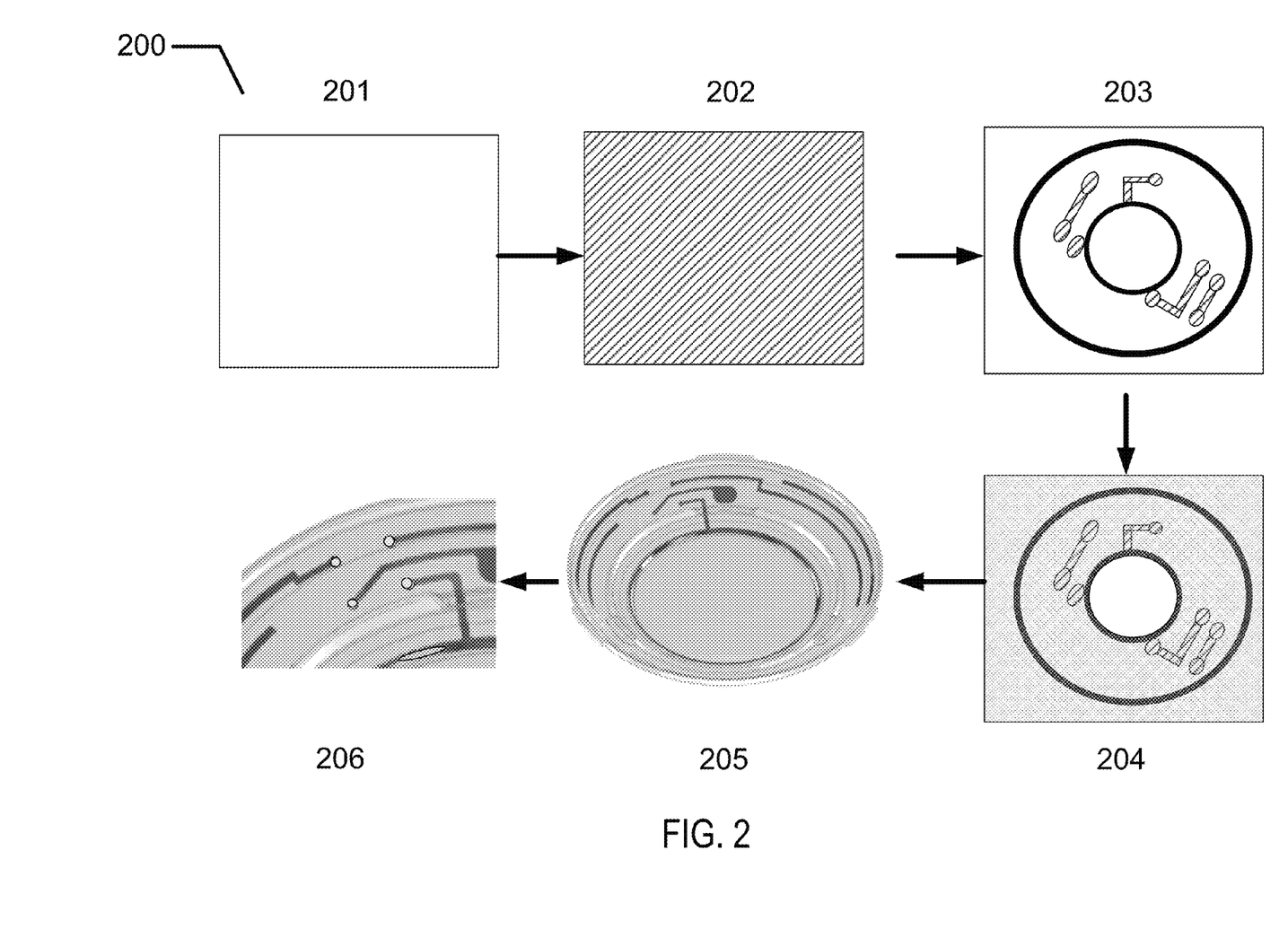
FIG. 2 illustrates an exemplary flow for forming Three-dimensional Surfaces that may be consistent with the formation of Thin Film Nanocrystal Integrated Circuit devices.

Proceeding to FIG. 2, an exemplary progression 200 for the formation of a Three-dimensional Substrate with conductive traces is illustrated. In some embodiments, a set of conductive features, which may after processing become interconnects on a Three-dimensional Surface, may be formed while base materials are kept in a planar shape. At 210, a base substrate may be formed. In ophthalmic embodiments, the substrate may be consistent with forming a part of an Ophthalmic Device. For example, the substrate may include Polyimide. In embodiments where the base substrate is formed from a conductive material, the surface may be coated with an insulator material, which may allow formation of interconnects on its surface. In some embodiments, where the substrate is comprised of polyimide, the substrate may be coated with an insulting layer, for example of aluminum oxide, which may provide the function of preshrinking the substrate before the thin film transistors are deposited or formed.

Figure 4:
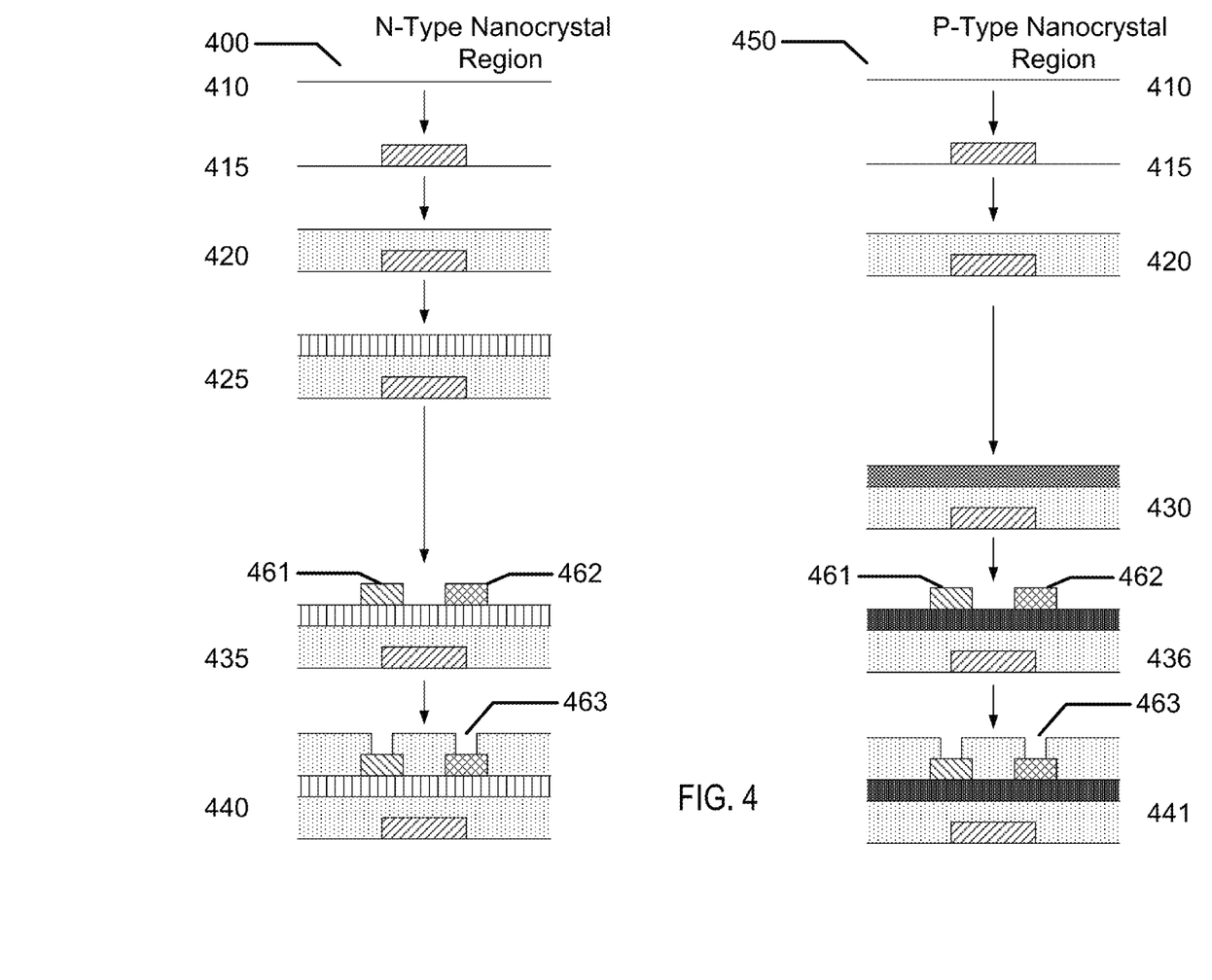
FIG. 4 illustrates an exemplary set of processing flow steps for the formation of complementary n and p-type Thin Film Nanocrystal Integrated Circuit devices, which may be useful for the inclusion into Ophthalmic Devices.

In some embodiments, the Thin Film Nanocrystal Integrated Circuit may be processed on the substrate obtained at 210. In some such embodiments, the nanocrystal processing steps, for example, as illustrated in FIG. 4, may have occurred prior to the substrate processing steps, as illustrated in FIG. 2. Accordingly, the substrate formed at 210 may include Thin Film Nanocrystal Integrated Circuit devices upon its surface. In other embodiments, the Thin Film Nanocrystal Integrated Circuit devices may be formed separately and may be connected to the conductive traces after the substrate has been processed at 260.

At 220, a conductive film may be applied to the substrate base. The conductive film may include, for example, an aluminum film. In some embodiments, the conductive film may be deformed where the flat substrate base may be Three-dimensionally Formed, and the conductive film may comprise a malleable conductive material of sufficient thickness to avoid mechanical failure during the three-dimensional forming processes.

At 230, the conductive film may be patterned into a shape that may form a predefined shape after the flat substrate is Three-dimensionally Formed. The shapes formed at 230 are for illustrative purposes only and other formations may be apparent. The conductive film, such as, for example, aluminum film, may be patterned through a variety of methods, for example, through photolithography with chemical etching or laser ablation. Alternatively, the imaged conductor patterns may have been deposited through a screen directly into the patterned shape. In embodiments where the Thin Film Nanocrystal Integrated Circuit devices are included on the substrate, the patterned shape formed at 230 may connect to the Thin Film Nanocrystal Integrated Circuit.

At 240, in some embodiments, the stacked layer comprising the base substrate with overlaid conductive features may be encapsulated in an overlaid material. In some embodiments, the overlaid material may comprise a thermoformable material, such as, for example, polyethylene terephtalate glycol (PETG). In some embodiments, or more specifically, where the stacked layer may be thermoformed, the encapsulation at 240 of the formed features may provide stability during thermoforming processes to create Three-dimensional Shapes. In some embodiments, a first planar thermoforming process may occur at 240 to seal the stacked layer, which may adhere the overlaid insulating material to the underlying substrate base and defined features in the conductive film. In some embodiments, a composite film may adversely affect the central optic region, and the central optic zone region of the stacked layer may be removed.

At 250, the stacked layer comprising the base material, formed conductive features, and overlaid encapsulating and insulating layer may be subjected to a thermoforming process, wherein the stacked layer may be Three-dimensionally Formed. In some embodiments, at 260, where the stacked layer is coated with an insulating layer, vias may be formed at 260 into the insulating material. At 260, the electrical conductive vias and openings may be included at appropriate locations, wherein the vias may allow the Thin Film Nanocrystal Integrated Circuit to connect with the encapsulated conductive features included on the stacked layer. The vias and openings may be formed through a variety of processes, including, for example, laser ablation, which may precisely create openings by ablating the top insulator layer of the stacked layer, thereby exposing an underlying conductive film area.

Figure 3:
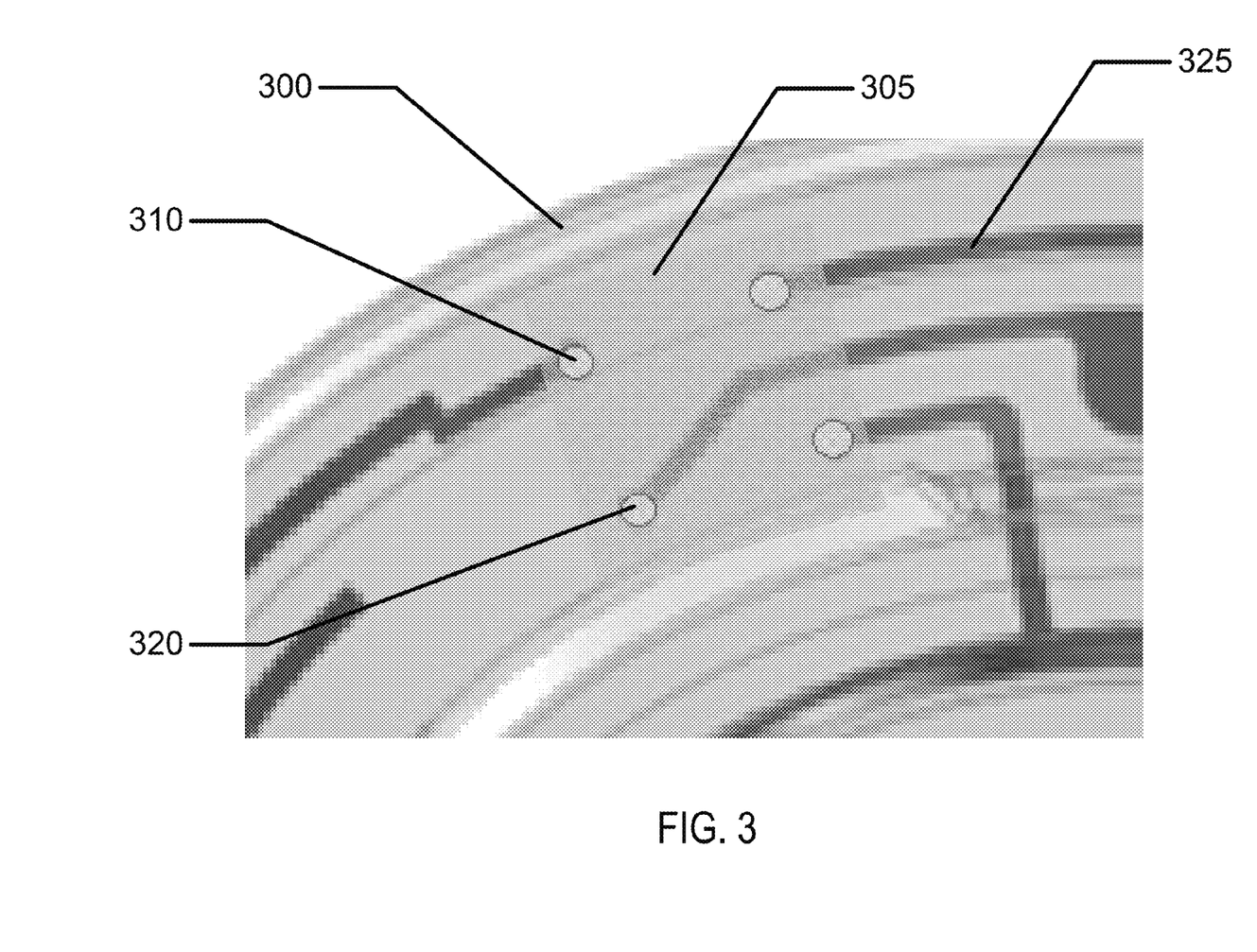
FIG. 3 illustrates an integrated circuit device connected to a Three-dimensionally Formed Insert Piece with conductive traces in at least two electrically conductive locations.

Electrically Connecting Thin Film Nanocrystal Integrated Circuit Devices Upon Three-Dimensionally Formed or Formable Insert Substrates Proceeding to FIG. 3, an exemplary embodiment of a Thin Film Nanocrystal Integrated Circuit 305 included on a Three-dimensionally Formed stacked layer comprising a substrate 300 with conductive traces 325 is illustrated. In some such embodiments, the Thin Film Nanocrystal Integrated Circuit 305 may be attached after the conductive traces 325 have been included on the substrate 300. Alternatively, the Thin Film Nanocrystal Integrated Circuit 305 may be included on the substrate 300 prior to placement of the conductive traces 325.

The components of the Thin Film Nanocrystal Integrated Circuit 305 may be electrically connected to the conductive traces 325 through interconnection features 310, 320 included on the substrate 300. The electrical connection at the interconnection features 310, 320 may connect the Thin Film Nanocrystal Integrated Circuit 305 to the electric components on the substrate 300 that may be critical for the functional operation of the Media Insert. Such electric components may include, for example, the energization elements, sensors, active optical elements, other integrated circuit designs, medicament pumps, and medicament dispersal devices. In some embodiments, including flip-chip orientations, interconnection features 310, 320 may comprise, for example, flowable solder balls or conductive epoxy. In embodiments where the conductive traces 325 and the interconnection features 310, 320 are encapsulated or insulated, vias may be cut out or diced from the stacked layer, which may allow connection between the components of the Thin Film Nanocrystal Integrated Circuit 305 and the interconnection features 310, 320.

Forming Thin Film Nanocrystal Integrated Circuit Transistors on Media Insert Surfaces Thin Film Nanocrystal Integrated Circuit devices may comprise a variety of structures including, for example, those based on field effect semiconducting device structures. In some such exemplary embodiments, the devices may include designs that have a gate electrode lying under, above, or at the nanocrystal layers.

Proceeding to FIG. 4, an exemplary embodiment of parallel processing flow 400, 450 that may produce complementary p and n-type Thin Film Nanocrystal Integrated Circuit devices is illustrated. In some embodiments, the n-type process 400 and the p-type process 450 may be performed in isolation. At 410, the base material for each type of device may be a flat or planar substrate upon which the devices may be formed. In some "bottom gate" electrode-type process embodiments, at step 415, a metallic or conductive material may be deposited to form an isolated gate electrode. In some embodiments, the gate electrode may be screened deposited from a sputtered or evaporated source. Other methods may include blanket deposition followed by patterned etching processes.

In some embodiments, at 420, a gate dielectric layer may be deposited to cover and surround the gate electrode. An exemplary method for said deposition may be to spin on the dielectric from a liquid precursor followed by a curing process. In other embodiments, the dielectric may be deposited by vapor deposition, and in some cases subsequently planarized by a technique such as, for example, chemical mechanical polishing. In other embodiments, a seed film of aluminum oxide may be grown in select regions by features, for example those comprising gold, which may block the growth except in the selected region. In some embodiments, atomic layer deposition processing may allow the selective growth of a quality dielectric film, such as, for example, an aluminum oxide atomic layer, in specific regions.

In some embodiments of n-type processing at 400, at 425, the n-type Thin Film Nanocrystal Integrated Circuit layer may be deposited upon the dielectric layer. This deposition may be regionally controlled by masked deposition of sprayed forms of the Thin Film Nanocrystal Integrated Circuit. In other embodiments, a blanket film may be applied followed by a patterned removal process. An exemplary material for the n-type layer may include, for example, CdSe nanocrystals, which may be interbound through ligands, such as thiocyanate. In some embodiments, the exemplary layer may be doped by indium. In some embodiments of ambipolar devices, the n-type Thin Film Nanocrystal Integrated Circuit film may be deposited on the dielectric layer at 425, and the n-type layer may be covered by p-type Thin Film Nanocrystal Integrated Circuit material at 430. In other embodiments, as illustrated, p-type processing 450 may not include a deposition of an n-type layer at 425.

In some p-type embodiments, at step 430, a p-type Thin Film Nanocrystal Integrated Circuit layer may be deposited upon the dielectric layer. This deposition may be regionally controlled by masked deposition of vapor phase forms of the Thin Film Nanocrystal Integrated Circuit. In other embodiments, a blanket film may be applied followed by a patterned removal process. In some embodiments, n-type processing 400 may not include a deposition of a p-type layer at 430. The p-type layer may include CuSe nanocrystals, for example. Alternatively, the p-type layer may comprise an organic semiconductor layer, which may include, for example, pentacene, tetracene, rubrene, and regioregular poly(3-hexylthiophene) (P3HT). It may be apparent to one ordinarily skilled in the art that other materials may comprise acceptable n and p-type organic TFT devices and nanocrystal TFT devices, which may be consistent within the scope of the art herein.

At 435 and 436, electrodes 461, 462 may be placed on the formative Thin Film Nanocrystal Integrated Circuit transistor device. As illustrated, the electrode placement at 435 for the n-type process may be separate from the electrode placement at 436 for the p-type process. In some embodiments, the placement of the electrodes 461, 462 at 435, 436 may occur simultaneously. There may be numerous means to form the source/drain electrodes including screened deposition from a sputtered or evaporated source. Other methods may include blanket deposition followed by patterned etching processes. Any method of forming isolated conductive electrode structures may be consistent with the art herein.

In some embodiments, at 440 and 441, insulator may be placed to encapsulate the source/drain electrodes or the entire device. An exemplary method of deposition may include spinning on the dielectric from a liquid precursor followed by a curing process. In other embodiments, the dielectric may be deposited by vapor deposition, and in some implementations, the dielectric may be planarized by a technique such as chemical mechanical polishing. In some embodiments, following the deposition of the insulator layer, contact openings 463 may be formed, such as through laser ablation processing or lithography imaged subtractive etching processes.

Figure 5:
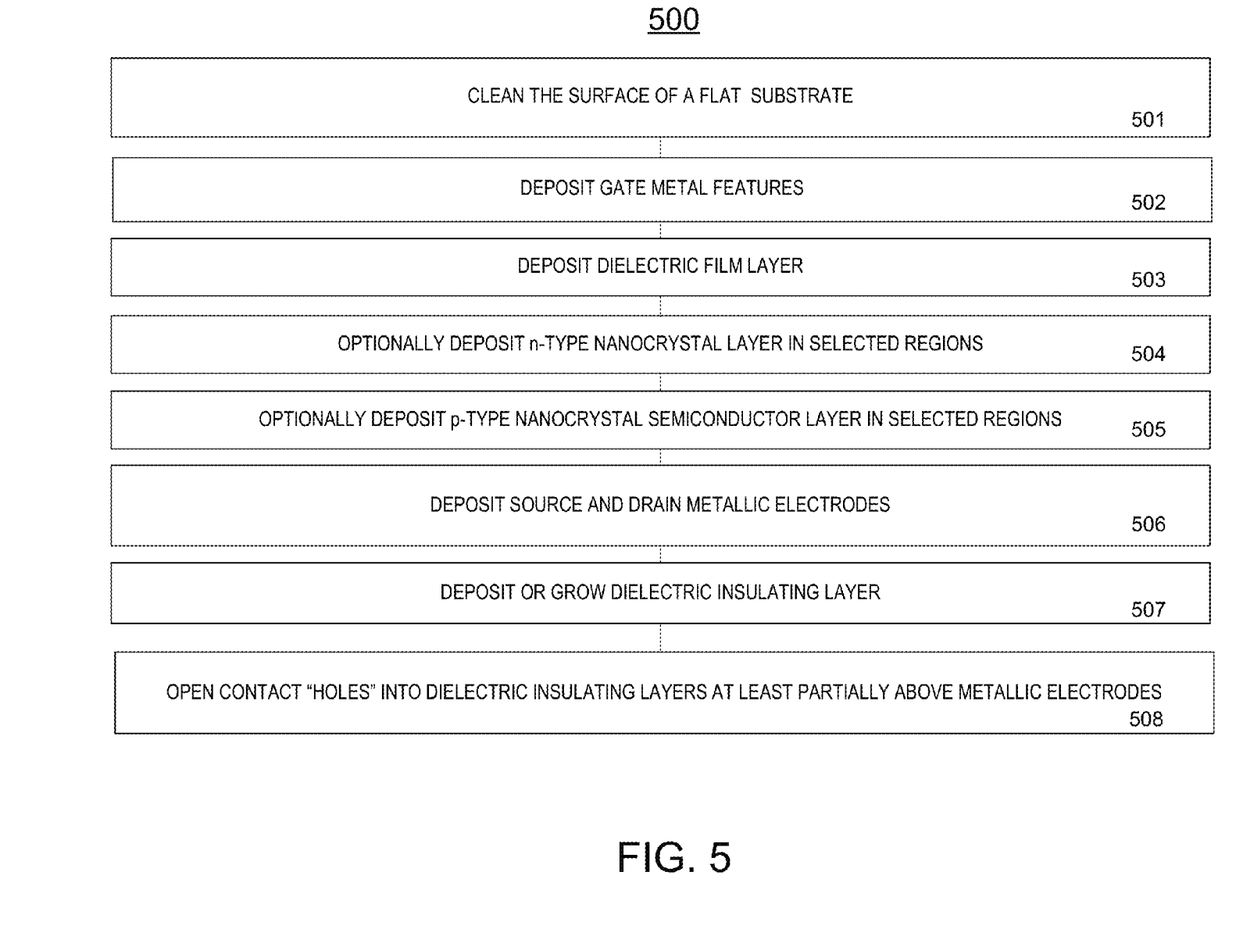
FIG. 5 illustrates an exemplary process flow for the creation of complementary Thin Film Nanocrystal Integrated Circuit devices consistent with later inclusion into Ophthalmic Devices.

Proceeding to FIG. 5, the exemplary process flow illustrated in FIG. 4 is summarized in textual form for the method and manner of forming Thin Film Nanocrystal Integrated Circuit devices. At 501, a flat substrate may be cleaned in preparation for processing into a Thin Film Nanocrystal Integrated Circuit device. In some embodiments, the substrate cleaned at 501 may comprise a three-dimensional shape. At 502 the gate metal features may be deposited and defined spatially. The resulting Thin Film Nanocrystal Integrated Circuit may comprise a type of gate under device structure, but other TFT architectures may be consistent with the scope of the art herein.

At 503, a dielectric film layer may be deposited over and around the gate electrode. In some preferred embodiments, the dielectric layer may be approximately parallel and flat above the gate dielectric after this processing. At 504 and 505, the n-type and p-type Thin Film Nanocrystal Integrated Circuit layers or organic semiconductor layers may be deposited into selected regions. Many techniques may be utilized to deposit selected regional layers including, for example, masked depositions and blanket depositions followed by subtractive etches. In some embodiments, the order of the two regions may be reversed, and in some embodiments, a repetition of steps at 501-508 may allow for the formation of complementary devices, wherein both n and p-type Thin Film Nanocrystal Integrated Circuit devices may be formed. Layering the n-type and p-type thin film nanocrystal may increase circuit flexibility and may allow for the formation of various non-transistor devices, including, for example a diode comprising a combination of an n and p type layer.

At 506, the source/drain electrodes may be formed. In some gate under device embodiments, the source and drain electrodes may be deposited over a roughly planar semiconductor region. At 507, in some embodiments, the device and electrodes may be surrounded by an encapsulating and insulating layer. In some embodiments, this layer may be formed or processed to yield a planar top surface.

In some embodiments, at 508, contact holes may opened into the dielectric insulating layers at least partially above regions where the conductive electrodes are located, wherein the contact holes may allow for external electrical contact with the formed devices. It may be obvious to one skilled in the art that the exemplary process flow 500 may result in numerous connected Thin Film Nanocrystal Integrated Circuit transistors to form functional circuits. In some embodiments, devices other than transistors may be formed, including, for example, diodes, resistors, and varactors.

Figure 6:
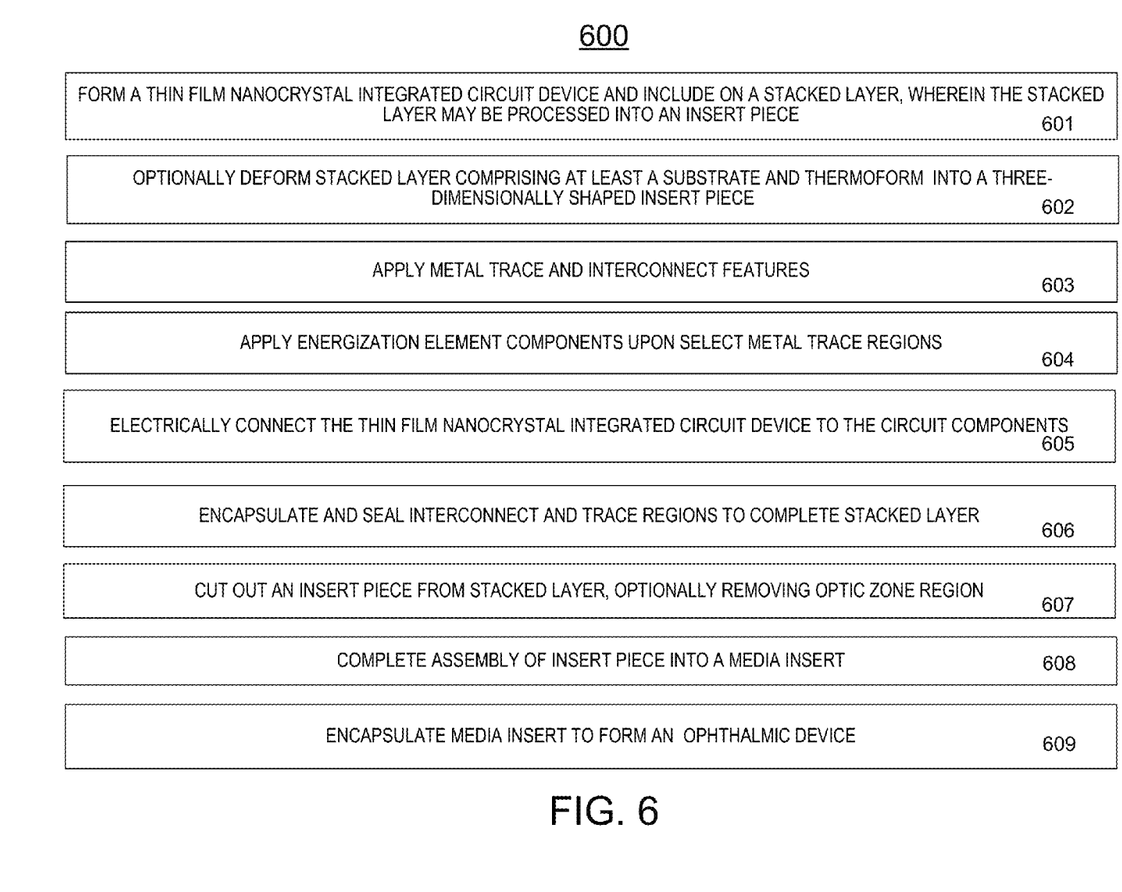
FIG. 6 illustrates an exemplary methodology for the further processing of the process flow referenced in exemplary fashion in FIG. 5 into an Ophthalmic Device.

Forming Ophthalmic Devices with incorporated Thin Film Nanocrystal Integrated Circuit devices Proceeding to FIG. 6, an exemplary process flowchart 600 of incorporating a Thin Film Nanocrystal Integrated Circuit device into an Ophthalmic Device is illustrated. At 601, a Thin Film Nanocrystal Integrated Circuit device may be formed, for example, through the processing steps illustrated in FIG. 5, and the device may be included on a stacked layer, wherein the stacked layer, comprising at least a base substrate, may be processed into an Insert Piece. In some embodiments, the stacked layer may further include other components, such as conductive interconnections and insulating layers, which may be included before or after the inclusion of the Thin Film Nanocrystal Integrated Circuit.

At 602, the stacked layer, which may include Thin Film Nanocrystal Integrated Circuit devices, conductive interconnections, and other formed devices included on the substrate, may be deformed into a three-dimensionally shaped piece. In some embodiments, for example, the deformation may include thermoforming the substrate, or, in others, the substrate may be folded. In alternate embodiments, the deformation at 602 may occur prior to the inclusion of the Thin Film Nanocrystal Integrated Circuit. At 603, the resulting three-dimensionally shaped stacked layer may have additional metal traces deposited upon it. In some embodiments, these metal traces may intersect with conductive via openings formed during the Thin Film Nanocrystal Integrated Circuit device processing.

In some embodiments where the energization elements are not included on the circuit substrate, at 604, the energization element components may be applied to the stacked layer on select metal trace regions, for example, through printing techniques, wherein the anodes, cathodes, and electrolyte regions may be printed onto the substrate or stacked layer. In some embodiments, separate Three-dimensionally Formed segments or pieces may include some circuit components of the Ophthalmic Device, such as, for example, the energization element. In some such embodiments, the sectioned circuit pieces may be connected to the Three-dimensionally Formed Insert Piece at 604, where the connection features may be used in conjunction with other sealants and encapsulants to attach the segmented circuit piece to the Insert Piece.

At 605, connection features may be applied to the conductive via openings formed during the Thin Film Nanocrystal Integrated Circuit device processing. In some embodiments, these connection features may include solder bumps of various materials. Alternatively, the connection features may include conductive epoxy. In some embodiments where the Thin Film Nanocrystal Integrated Circuit is included on the substrate prior to the application of the circuit components, such as, for example, the energization elements or conductive traces, a separate connection step at 605 may not be necessary. In such embodiments, the inclusion of the circuit components, such as at 604, may directly connect those components to the Thin Film Nanocrystal Integrated Circuit.

At 606, the stacked layer comprising the substrate with circuit components, including the Thin Film Nanocrystal Integrated Circuit, may be encapsulated and sealed. The encapsulation at 606 may utilize a variety of techniques and materials, including, for example, the vapor phase deposition of parylene with screening apparatus to allow certain regions to remain unsealed or unencapsulated. In some embodiments, at 607, the encapsulated stacked layer may be singulated or cut out to form an insert piece. In some embodiments, the central region of the resulting Insert Piece, which may reside in the optic zone, may remain for various functional purposes including forming the front optic surface for a meniscus based lens element. In other embodiments, the central Optic Zone may be removed to form an annular-type Insert Piece. At 608, the formed Insert Piece may be processed to complete assembly into a Media Insert, which may further include a variable optic region, for example, comprising a liquid meniscus.

At 609, the Media Insert may be encapsulated in an Ophthalmic Device. The Media Insert may be encapsulated at 609 through a variety of methods, including an injection molding process, for example. In some embodiments, the Media Insert may be placed into a front curve mold with a small amount of reactive mixture or predose amount. By precuring the reactive mixture, the Media Insert may be temporarily affixed to the mold piece in a specified location. Additional Reactive Mixture or the postdose amount may be added to the front curve mold. The back curve mold may be placed proximate to the front curve mold, wherein the proximity creates a lens-forming cavity and allows the Reactive Mixture to encapsulate the Media Insert. The Reactive Mixture may then be fully cured to form the Ophthalmic Device. In some embodiments, the Reactive Mixture may include hydrogel-forming materials.

Figure 7:
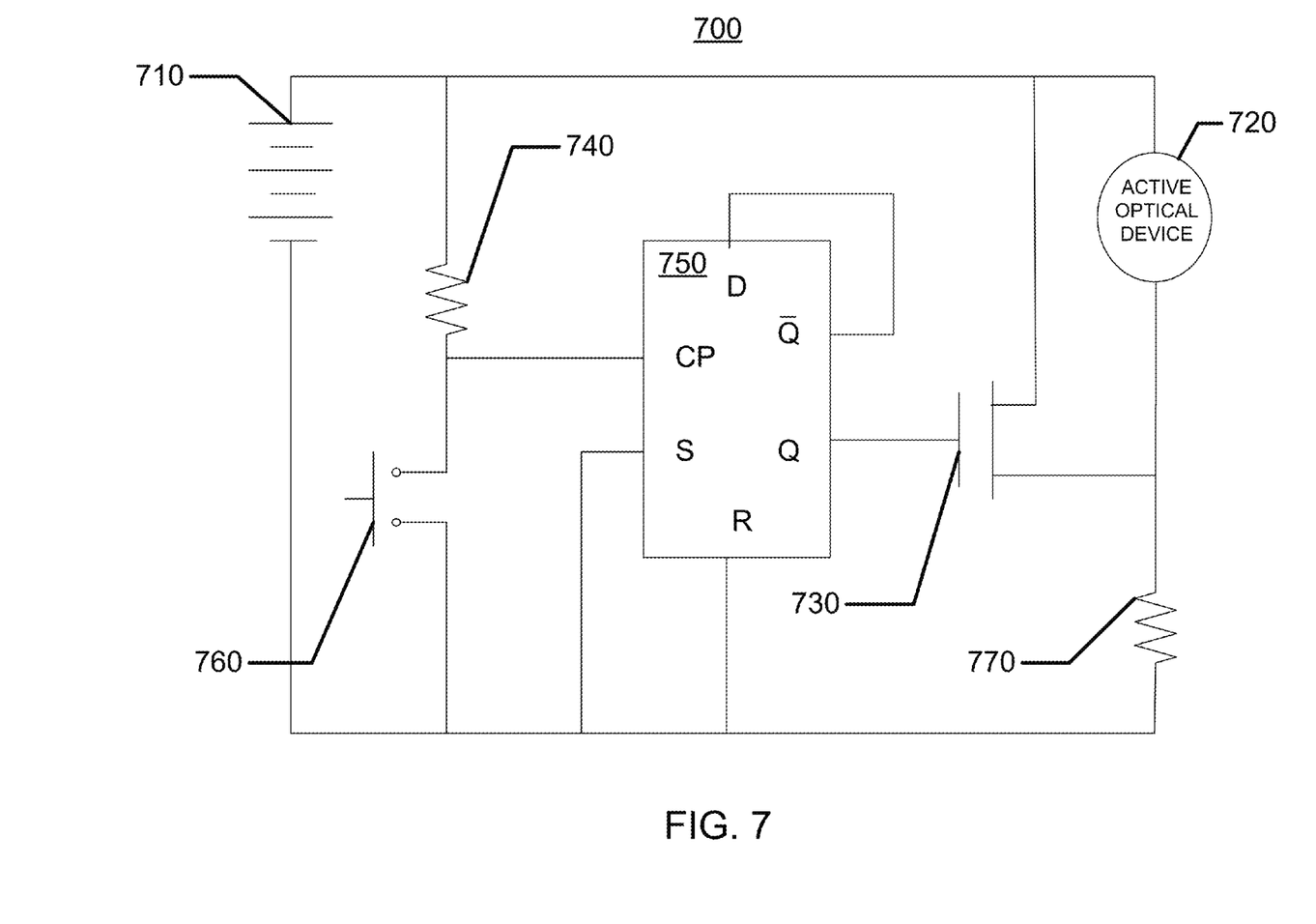
FIG. 7 illustrates an exemplary electronic circuit function utilizing Thin Film Nanocrystal Integrated Circuits that may be included in an Ophthalmic Device.

An Example of an Ophthalmic Embodiment Utilizing Thin Film Nanocrystal Integrated Circuit Transistors Proceeding to FIG. 7, an exemplary electronic circuit 700 consistent with an of an ophthalmic embodiment where an energization element may respond to a mechanical switch as an activation device and may apply electrical potential when activated across an active Ophthalmic Device including a meniscus-based focusing element.

An energization element 710 may energize circuits that may contain Thin Film Nanocrystal Integrated Circuit transistors, and in some embodiments, the energization element 710 may be comprised of various and numerous battery cells connected in a series manner. As an example, cells may be connected to generate an electrical potential in the energization element of approximately 20 Volts. Other embodiments may include more or less cells connected together to generate energization potentials ranging from approximately 10 Volts to 100 volts.

The energization element 710 may apply its potential across an active ophthalmic element 720. In some embodiments, the active optical element 720 may be a meniscus lens based device that may respond by changing the shape of a meniscus based on the application of potential across two immiscible fluids. In some embodiments of a meniscus lens based devices, the device may function essentially as an extremely high impedance capacitor, from an electrical perspective. Therefore, the energization element 710 may initially charge the active optical element 720 through a resistive element 770. When the potential fully charges the capacitive element, the energization element 710 may not have a large dissipative load on it. In embodiments with more complex circuitry, start-up circuitry may be defined to further ensure that the energization element 710 may not be discharged.

The electronic circuit 700 may further include a "D-Flip-Flop" circuit, based on a circuit using the complementary n and p-type Thin Film Nanocrystal Integrated Circuit transistors. The D-FlipFlop 750 may have its D and Q(not) outputs connected together, and the Set(s) and Reset(R) may be connected to ground. The output of Q may then flip from one state to the next when there is a voltage level change at the Clock (CP) input. That input may be set by the energization element 710, through a resistive element 740.

When an external switch 760 may be activated, such as where a user exerts pressure onto a pressure switch, the potential at CP may be brought close to ground, and this level change may toggle the state of the D-FlipFlop 750. When the level changes at Q, a transistor 730 connected thereto may be "Turned-On" and may conduct across the active optical element 720 effectively shorting the active optical element 720 and allowing a change in the active optical state. Numerous designs of flip-flop circuits may function in similar manners as described with a D-FlipFlop circuit 750 with multiple methods of activating and controlling the status of the exemplary circuit 700.

Figure 8:
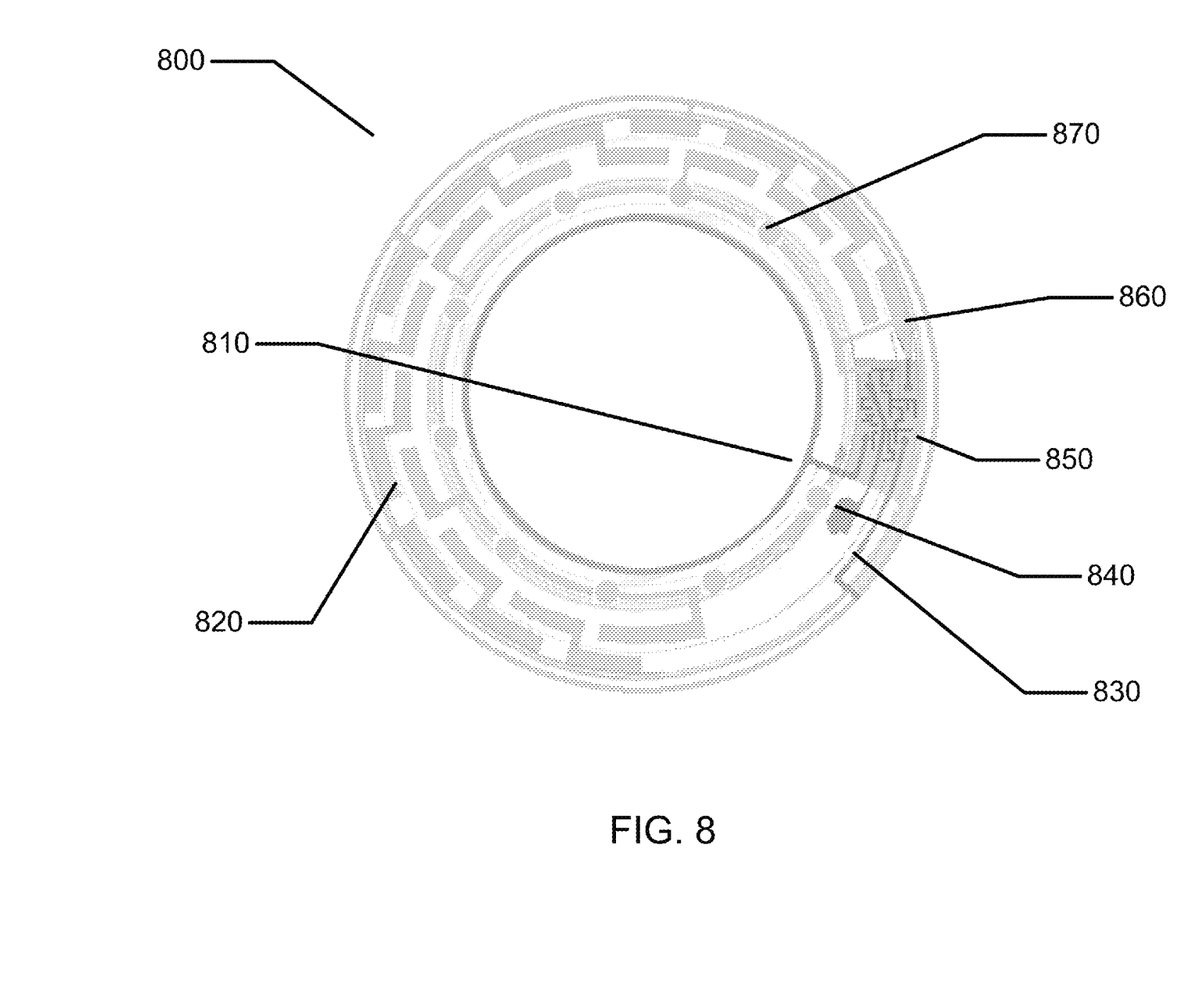

Proceeding to FIG. 8, an exemplary embodiment of an Insert Piece that may be consistent with the circuit embodiment illustrated in FIG. 7 is illustrated. In some embodiments, a connection point 810 may allow for electrical communication between the meniscus lens and the circuit. Some embodiments may include multiple energization cells 820 connected in series in order to generate the necessary potentials required for operation of Thin Film Nanocrystal Integrated Circuit based circuits. In some such embodiments, the series of energization cells 820 may define an energization element of approximately 5 volts, for example. The energization element may include two contacts 830, 840.

In some embodiments, a D-Type FlipFlop circuit 850 may comprise multiple circuit components, such as, for example, those illustrated in FIG. 7. The D-Type Flip Flop circuit 850 may contain both n and p-type Thin Film Nanocrystal Integrated Circuit transistors and the resistive elements 740 and 770. In some embodiments, a second contact 860 may define an alternative connection point for the meniscus lens.

Some embodiments may include a pressure-sensitive switch 870 or membrane switch that may be formed from spaced metallic traces that may complete a contact between the two sides when the switch 870 is deflected by pressure. In some embodiments, the D-Type FlipFlop circuit 850 may include additional circuit elements, which may provide a debounce function or a time-delayed debounce function for the action of the described activation device. Other activation devices, such as hall-effect devices, may provide equivalent switching function to that described.

Specific examples have been described to illustrate aspects of inventive art relating to the formation, methods of formation, and apparatus of formation that may be useful to form energization elements upon electrical interconnects on Three-dimensional Surfaces. These examples are for said illustration and are not intended to limit the scope in any manner. Accordingly, the description is intended to embrace all embodiments that may be apparent to those skilled in the art.

Conclusion

The present invention, as described above and as further defined by the claims below, provides methods and apparatus to form Thin Film Nanocrystal Integrated Circuit transistors upon Three-dimensionally Formed Insert Pieces. In some embodiments, the present invention includes incorporating the Three-dimensional Surfaces with Thin Film Nanocrystal Integrated Circuit based thin film transistors, electrical interconnects, and energization elements into an Insert Piece for incorporation into Ophthalmic Device. In some embodiments, the Insert Piece may be directly used as a Media Insert or incorporated into an Ophthalmic Device.

The invention claimed is:

1. A method of forming an ophthalmic device with a media insert comprising:
depositing a first thin film nanocrystal integrated circuit layer on a first substrate;
cutting out a first insert piece from the first substrate;
assembling the first insert piece into a first media insert; and
molding a first encapsulating layer around the media insert, wherein the molding forms the ophthalmic device.

2. The method of claim 1 wherein:
the depositing of the first thin film nanocrystal integrated circuit layer on the first substrate occurs before the cutting out of the first insert piece from the first substrate.

3. The method of claim 1 additionally comprising the steps of:

forming a first gate conductor on the first substrate proximate to the first thin film nanocrystal integrated circuit layer.

4. The method of claim 1 additionally comprising the steps of:
depositing a first energization element upon a first region of the first substrate, wherein the first energization element is in electrical connection with the first thin film nanocrystal integrated circuit layer.

5. The method of claim 1 additionally comprising the steps of:
forming a portion of the first substrate into a three-dimensional shape.

6. The method of claim 1 additionally comprising the steps of:
depositing a second thin film nanocrystal integrated circuit layer on a second substrate;
cutting out a second insert piece from the second substrate;
assembling the second insert piece into a first media insert.

7. The method of claim 3 wherein:
the forming of the gate conductor occurs before the deposition of the first thin film nanocrystal integrated circuit layer on the first substrate.

8. The method of claim 4 wherein:
the first energization element comprises an electrochemical cell.

9. The method of claim 4 additionally comprising:
forming a first source/drain conductor on the first thin film nanocrystal integrated circuit layer; and
forming electrical interconnect traces upon the first substrate, wherein the electrical interconnect traces are capable of placing the first source/drain conductor in electrical communication with the first energization element.

10. The method of claim 5 wherein:
the forming of the portion of the first substrate into the three-dimensional shape occurs after the depositing of the first thin film nanocrystal integrated circuit layer on the first substrate.

11. The method of claim 5 wherein:
the forming of the portion of the first substrate into the three-dimensional shape comprises a thermoforming process.

12. The method of claim 5 wherein:
the forming of the portion of the first substrate into the three-dimensional shape comprises a folding process.

13. The method of claim 5 additionally comprising:
depositing a second energization element upon a third substrate;
cutting out a third insert piece from the third substrate; and
assembling the third insert piece into the first media insert.

14. The method of claim 6 wherein:
the second thin film nanocrystal integrated circuit layer comprises a first n-type thin film nanocrystal integrated circuit layer and the first thin film nanocrystal integrated circuit layer comprises a first p-type thin film nanocrystal integrated circuit layer.

15. The method of claim 8 additionally comprising:
sealing the first energization element to the first substrate.

16. The method of claim 9 wherein:
the electrical interconnect traces are capable of placing the first energization element in electrical communication with the first gate conductor.

17. The method of claim 9 wherein:
the forming of the first source/drain conductor on the first thin film nanocrystal integrated circuit layer is performed by the same processing as the forming of the electrical interconnect traces upon the first substrate.

18. A second method for forming an ophthalmic device with a media insert comprising:
depositing a second n-type thin film nanocrystal integrated circuit layer on a fourth substrate;
depositing a second p-type thin film nanocrystal integrated circuit layer on the fourth substrate;
depositing a first conductive layer upon the fourth substrate, wherein the conductive layer comprises a plurality of isolated conductive traces, wherein the isolated conductive traces comprise source/drain conductive features in electrical communication with the second n-type thin film nanocrystal integrated circuit layer and the second p-type thin film nanocrystal integrated circuit;
thermoforming a region of the fourth substrate into a three-dimensional shape, wherein the region includes a portion of the second n-type thin film nanocrystal integrated circuit layer, a portion of the second p-type thin film nanocrystal integrated circuit layer, and a portion of the first conductive layer;
depositing a third energization element upon a portion of the conductive layer, wherein the third energization element is in electrical communication with the first conductive layer;
cutting out a fourth insert piece from the fourth substrate;
assembling the fourth insert piece into a second media insert; and
molding a second encapsulating layer around the second media insert, wherein the molding forms the ophthalmic device.

19. The second method of claim 18 wherein:
the third energization element comprises a plurality of energization components, wherein the first conductive layer is capable of placing the energization components in electrical series with each other.

20. The second method of claim 18 additionally comprising:
depositing a second conductive layer upon a fifth substrate, wherein a portion of the second conductive layer comprises a plurality of isolated electrically conductive features, wherein the isolated electrically conductive features are capable of forming membrane switches with a region of the first conductive layer.

* * * * *